United States Patent
Atluri et al.

(10) Patent No.: US 8,732,136 B2
(45) Date of Patent: *May 20, 2014

(54) RECOVERY POINT DATA VIEW SHIFT THROUGH A DIRECTION-AGNOSTIC ROLL ALGORITHM

(75) Inventors: Rajeev Atluri, Campbell, CA (US); Sudhakar Pannerselvam, Hyderabad (IN); Jayesh Shah, Hyderabad (IN); Satish Kumar, Hyderabad (IN); Srin Kumar, Sunnyvale, CA (US); Kishor Paygude, Pune (IN)

(73) Assignee: Inmage Systems, Inc., San Jose, CA (US)

( * ) Notice: Subject to any disclaimer, the term of this patent is extended or adjusted under 35 U.S.C. 154(b) by 487 days.

This patent is subject to a terminal disclaimer.

(21) Appl. No.: 12/691,745

(22) Filed: Jan. 22, 2010

(65) Prior Publication Data
US 2011/0184918 A1 Jul. 28, 2011

Related U.S. Application Data

(63) Continuation-in-part of application No. 11/438,401, filed on May 22, 2006, now Pat. No. 7,676,502, and a continuation-in-part of application No. 12/344,364, filed on Dec. 26, 2008, now Pat. No. 8,527,721, and a continuation-in-part of application No. 12/344,345, filed on Dec. 26, 2008, now Pat. No. 8,527,470, and a continuation-in-part of application No. 12/344,335, filed on Dec. 26, 2008.

(51) Int. Cl.
*G06F 17/00* (2006.01)

(52) U.S. Cl.
USPC ............ 707/683; 707/684; 707/650; 711/162

(58) Field of Classification Search
USPC .......... 707/683, 684, 686, 690, 999.202, 650; 711/162

See application file for complete search history.

(56) References Cited

U.S. PATENT DOCUMENTS

| | | | | |
|---|---|---|---|---|
| 6,018,746 A | * | 1/2000 | Hill et al. | 707/679 |
| 6,061,770 A | * | 5/2000 | Franklin | 711/162 |
| 6,732,125 B1 | * | 5/2004 | Autrey et al. | 707/640 |
| 6,771,843 B1 | * | 8/2004 | Huber et al. | 382/305 |
| 6,792,518 B2 | * | 9/2004 | Armangau et al. | 711/162 |
| 6,915,315 B2 | * | 7/2005 | Autrey et al. | 1/1 |
| 7,133,884 B1 | * | 11/2006 | Murley et al. | 1/1 |
| 7,287,133 B2 | * | 10/2007 | Rowan et al. | 711/156 |
| 7,296,115 B2 | * | 11/2007 | Kano | 711/112 |
| 7,373,366 B1 | * | 5/2008 | Chatterjee et al. | 1/1 |

(Continued)

*Primary Examiner* — Phuong Thao Cao
(74) *Attorney, Agent, or Firm* — Raj Abhyanker, P.C.

(57) ABSTRACT

A method and system of recovery point data view shift through a direction-agnostic roll algorithm is disclosed. The method includes forming a data view around a recovery point, and shifting the data view around the recovery point through a direction-agnostic roll algorithm that uses at least one of a roll-forward algorithm to shift the data view to a time after the recovery point and a roll-backward algorithm to shift the data view to a time before the recovery point. A data integrity is determined to be consistent at the recovery point by examining data and meta-data associated with the recovery point. The recovery point is associated with one of an automatically generated event, a user definable event, and/or a prepackaged event. A marker data is generated at the recovery point to enable the direction-agnostic roll algorithm to reduce a recovery time objective when an algorithm is applied.

14 Claims, 8 Drawing Sheets

(56) References Cited

U.S. PATENT DOCUMENTS

| | | | |
|---|---|---|---|
| 7,437,603 B2* | 10/2008 | Ebata et al. | 714/6.1 |
| 7,536,529 B1* | 5/2009 | Chatterjee et al. | 711/202 |
| 7,613,945 B2* | 11/2009 | Soran et al. | 714/5.11 |
| 7,860,832 B2* | 12/2010 | Midgley et al. | 707/634 |
| 7,979,741 B2* | 7/2011 | Amano et al. | 714/19 |
| 2003/0135703 A1* | 7/2003 | Martin et al. | 711/162 |
| 2004/0030954 A1* | 2/2004 | Loaiza et al. | 714/20 |
| 2004/0107226 A1* | 6/2004 | Autrey et al. | 707/204 |
| 2004/0260673 A1* | 12/2004 | Hitz et al. | 707/1 |
| 2004/0260678 A1* | 12/2004 | Verbowski et al. | 707/3 |
| 2005/0015416 A1* | 1/2005 | Yamagami | 707/204 |
| 2005/0027749 A1* | 2/2005 | Ohno et al. | 707/200 |
| 2005/0050110 A1* | 3/2005 | Sawdon et al. | 707/201 |
| 2005/0066095 A1* | 3/2005 | Mullick et al. | 710/200 |
| 2005/0071390 A1* | 3/2005 | Midgley et al. | 707/204 |
| 2005/0102547 A1* | 5/2005 | Keeton et al. | 714/1 |
| 2005/0182953 A1* | 8/2005 | Stager et al. | 713/189 |
| 2005/0223043 A1* | 10/2005 | Randal et al. | 707/200 |
| 2006/0020572 A1* | 1/2006 | Ishii et al. | 707/1 |
| 2006/0047895 A1* | 3/2006 | Rowan et al. | 711/112 |
| 2006/0047997 A1* | 3/2006 | Anderson et al. | 714/4 |
| 2006/0047999 A1* | 3/2006 | Passerini et al. | 714/6 |
| 2006/0053139 A1* | 3/2006 | Marzinski et al. | 707/101 |
| 2006/0059209 A1* | 3/2006 | Lashley | 707/202 |
| 2006/0064541 A1* | 3/2006 | Kano | 711/114 |
| 2006/0206536 A1* | 9/2006 | Sawdon et al. | 707/200 |
| 2006/0212481 A1* | 9/2006 | Stacey et al. | 707/104.1 |
| 2007/0022117 A1* | 1/2007 | Keohane et al. | 707/8 |
| 2007/0174669 A1* | 7/2007 | Ebata et al. | 714/6 |
| 2008/0134163 A1* | 6/2008 | Golde et al. | 717/168 |
| 2009/0019308 A1* | 1/2009 | Amano | 714/19 |

* cited by examiner

RECOVERY POINT DATA VIEW SHIFT THROUGH A DIRECTION-AGNOSTIC ROLL ALGORITHM

CLAIM OF PRIORITY

This application is a continuation-in-part of the following applications:

U.S. Utility application Ser. No. 11/438,401 (now U.S. Pat. No. 7,676,502 B2) titled "RECOVERY POINT DATA VIEW SHIFT THROUGH A DIRECTION-AGNOSTIC ROLL ALGORITHM" filed on May 22, 2006.

U.S. Utility application Ser. No. 12/344,364 (now U.S. Pat. No. 8,527,721 B2) titled "GENERATING A RECOVERY SNAPSHOT AND CREATING A VIRTUAL VIEW OF THE RECOVERY SNAPSHOT" filed on Dec. 26, 2008.

U.S. Utility application Ser. No. 12/344,345 (now U.S. Pat. No. 8,527,470 B2) titled "RECOVERY POINT DATA VIEW FORMATION WITH GENERATION OF A RECOVERY VIEW AND A COALESCE POLICY" filed on Dec. 26, 2008.

U.S. Utility application Ser. No. 12/344,335 titled "COALESCING AND CAPTURING DATA BETWEEN EVENTS PRIOR TO AND AFTER A TEMPORAL WINDOW" filed on Dec. 26, 2008.

FIELD OF TECHNOLOGY

This disclosure relates generally to the technical fields of software and/or hardware technology and, in one example embodiment, to a method and/or system of recovery point data view shift through a direction-agnostic roll algorithm.

BACKGROUND

A system (e.g., a banking system, an online auction system, etc.) may perform numerous operations (e.g., a data storage, a data backup, a data retrieval, a data modification, a data transfer, etc.) on a transaction (e.g., an ATM deposit, an ATM withdrawal, a purchase, a return, an exchange, etc.) of the system. The transaction (e.g., the ATM deposit) may be centrally stored and/or monitored. However, in an event of a system failure (e.g., a system crash, a power outage, etc.), a data state may be lost after the system failure. In addition, the data state right before the system failure may be unreliable (e.g., incomplete, corrupt, etc.).

As such, a continuous data protection may be initiated when a change is made to the transaction. Therefore, the continuous data protection may also result in data storage inefficiencies due to a large volume of changes that are being stored. The large volume of changes may also make it difficult to locate a specific transaction (e.g., the ATM deposit, the ATM withdrawal, the purchase, the return, the exchange, etc.) and/or a particular change associated with an occurrence of a specific event (e.g., midnight, every 5 minutes, system crash, configuration change, failed log-in, and/or as indicated by the events module 108 of FIG. 1, etc.). As such, an expensive amount of resource overhead (e.g., storage space, time, manpower, money) in the system may be required to provide adequate service levels.

SUMMARY

A method and system of recovery point data view shift through a direction-agnostic roll algorithm is disclosed.

In one aspect, a method includes forming a data view around a recovery point, and shifting the data view around the recovery point through a direction-agnostic roll algorithm that uses at least one of a roll-forward algorithm to shift the data view to a time after the recovery point and a roll-backward algorithm to shift the data view to a time before the recovery point. A data integrity may be determined to be consistent by examining data and meta-data associated with the recovery point. The recovery point may be associated with at least one of an automatically generated event, a user definable event, and/or a prepackaged event.

In addition, a marking data may be generated at the recovery point to enable the direction-agnostic roll algorithm to operate and to reduce a recovery time objective when an algorithm is applied. The data adjacent to the recovery point can be maintained in a log data structure stored in a file system as a multitude of files. The data around the recovery point and other determinable recovery points may be coalesced at a threshold interval to reduce storage requirements. Differing quantities of data around the recovery point may be retained based on a programmatic methodology that considers space utilization and a data consistency associated with the time after the recovery point and the time before the recovery point. The method may be in a form of a form of a machine-readable medium embodying a set of instructions that, when executed by a machine, may cause the machine to perform the method.

In another aspect, a network includes generating a recovery snapshot at a predetermined interval to retain an ability to position forward and/or backward when a delayed roll back algorithm is applied, and creating a virtual view of the recovery snapshot using an algorithm tied to an original data, a change log data, and a consistency data related to an event.

An access request to the original data may be redirected based on a meta-data information provided in the virtual view. A time stamp data, a location of a change, and a time offset of the change as compared with the original data may be substantially retained. A relational database may be utilized to process the change log data in a meta-data format, and to process other on-disk data using a binary-tree format.

The virtual view may be specific to a volume object in a kernel that imitates another volume having the original data. A virtual view may be managed by a kernel space that processes an access request through at least one table using a meta-data created in a retention log. The virtual view may be exported as a virtual volume using an iSCSI and/or a fiber channel transport to an external processing device. The change log data may be applied when the virtual view is unfrozen after a user session reaches a level state.

A series of indexes of the virtual view may be generated to enable a linking to an event description of the virtual view rather than to an actual data in the original data, and the virtual view may be automatically created in at least one of a scheduled and an event driven manner, The virtual view may be communicated to a backup tape to provide extended data retention using a lifecycle management policy.

In yet another aspect, a network includes a virtualization module to form a data view around a recovery point, a recovery module to generate a recovery snapshot having an ability to position forward and/or backward from the recovery point when a rolling algorithm is applied, and an events module to generate a coalesce policy around the recovery point to reduce a storage requirement. An export module may transfer the data view to an external processing device as a virtual volume using an iSCSI and/or a fiber channel transport interface. The export module may automatically communicate the data view to a backup tape to provide extended data retention using a lifecycle management policy.

In a further aspect, a method includes determining a temporal window based on at least one of a user data and an automatically generated data, coalescing data between events prior to the temporal window, and capturing data between events after the temporal window. The coalescing data between events prior to the temporal window may be determined by a set of overlapping operations to a data set, wherein certain operations have non-overlapping sectors which are not coalesced.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method and system of recovery point data view shift through a direction-agnostic roll algorithm is disclosed. In the following description, for the purposes of explanation, numerous specific details are set forth in order to provide a thorough understanding of the various embodiments. It will be evident, however to one skilled in the art that the various embodiments may be practiced without these specific details.

Figure 3:
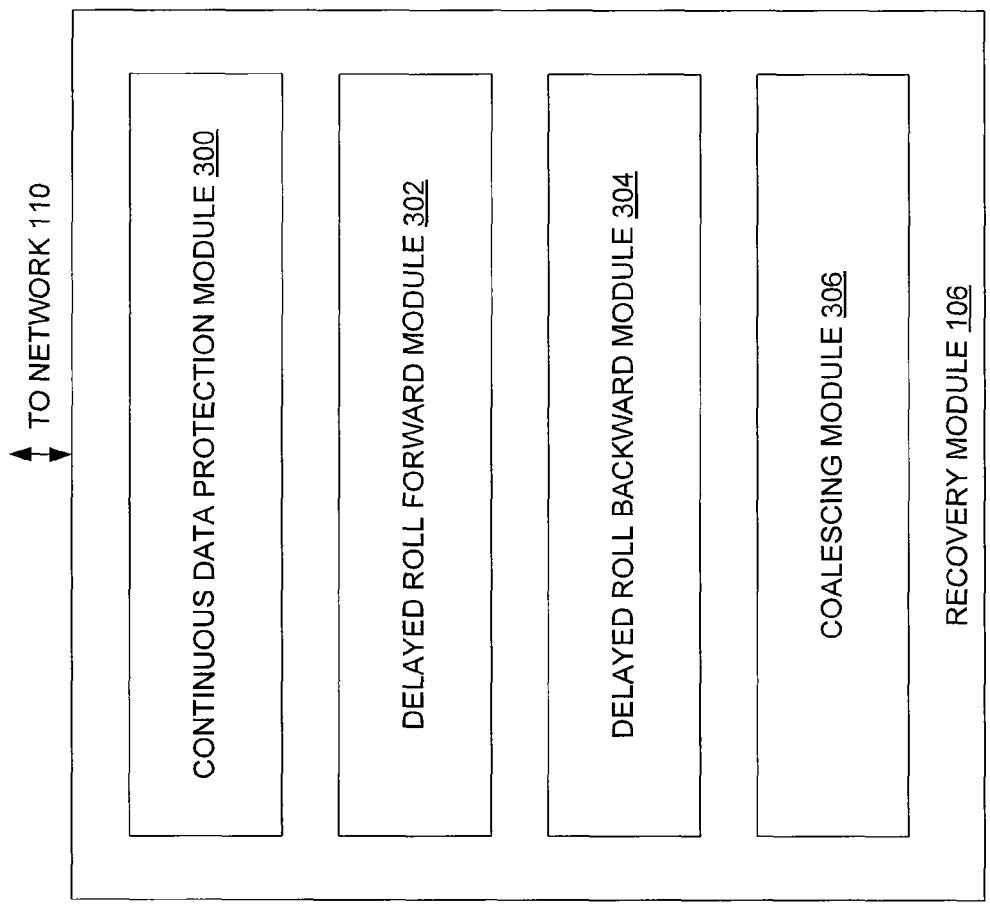
FIG. 3 is an exploded view of the recovery module of FIG. 1 having a continuous data protection module, a delayed roll forward module, a delayed roll backward module, and/or a coalescing module, according to one embodiment.

In an example embodiment, a data view is formed (e.g., formed by a virtualization module 104 of FIG. 1) around a recovery point (e.g., as specified by an events module 108 of FIG. 1), and the data view is shifted (e.g., shifted by a recovery module 106 of FIG. 1) around the recovery point through a direction-agnostic roll algorithm that uses at least one of a roll-forward algorithm (e.g., a roll-forward algorithm of a delayed roll forward module 302 of FIG. 3) to shift the data view to a time after the recovery and a roll-backward algorithm (e.g., a roll backward algorithm of a delayed roll backward module 304 of FIG. 3) to shift the data view to a time before the recovery point.

In an additional example embodiment, a recovery snapshot is generated (e.g., generated by a virtualization module 104 of FIG. 1) at a predetermined interval (e.g., as specified by an events module 108 of FIG. 4) to retain an ability to position forward and backward when a delayed roll back algorithm (e.g., a delayed roll back algorithm of a delayed roll backward module 304 of FIG. 3) is applied. As used herein, the term "recovery snapshot" refers to a copy of the state of a system at a particular point in the past. A full backup of a large data set may take a long time to complete. On multi-tasking or multi-user systems, there may be writes to that data while being backed up. This may prevent the backup from being complete and indivisible and may introduce a version skew that may result in data corruption. For example, if a user moves a file from a directory that has not yet been backed up into a directory that has already been backed up, then that file may be missing on the backup media.

Version skew may also cause corruption with files that change their size or contents underfoot while being read. One approach to safely backing up live data may be to temporarily disable write access to data during the backup, either by stopping the accessing applications or by using the locking API provided by the operating system to enforce exclusive read access. This may be tolerable for low-availability systems (on desktop computers and small workgroup servers, on which regular downtime is acceptable). High-availability 24/7 systems, however, may not bear service stoppages.

To avoid downtime, high-availability systems may instead perform the backup on a snapshot, which may be a read-only copy of the data set frozen at a point in time, and may allow application to continue writing to their data. Read-write snapshots may be branching snapshots, because they implicitly create diverging versions of their data. An image of data block copies is not a recovery snapshot because a data block copy is a copy of data generated to be combined to present a view of the data at a recovery point. The significance of this distinction is that a recovery snapshot does not require the combination of data block copies. As a result, an image of data block copies is not the same as a recovery snapshot.

Figure 4:
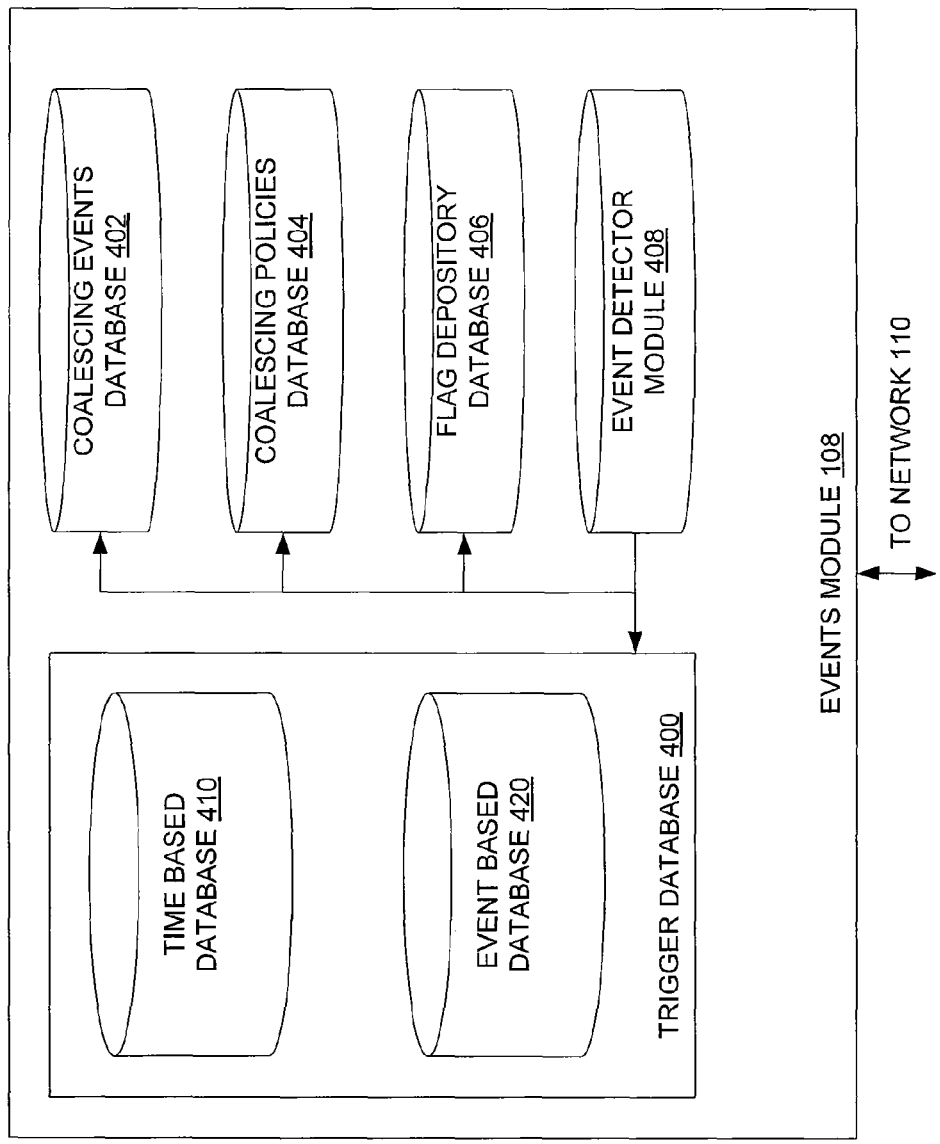
FIG. 4 is an exploded view of the events module of FIG. 1 having a trigger database having a time based database and/or a event based database, a coalescing events database, a coalescing policies database, a flag depository database, and/or an event detector module, according to one embodiment.

A virtual view may be created (e.g., created by the virtualization module 104 of FIG. 2) using an algorithm (e.g., a continuous disaster recovery algorithm of a continuous data protection module 300 of FIG. 3) tied to an original data, a change log data, and a consistency data related to an event (e.g., as specified by the events module 108 of FIG. 4). The virtual view may include, but is not limited to a stored query accessible as a virtual table composed of the result set of a query. The virtual view may be a dynamic, virtual table computed or collated from data in the database. Changing the data in the virtual table alters the data shown in subsequent invocations of the view. The views may have some advantages over tables. The views can represent a subset of the data contained in a table. The views can join and simplify multiple tables into a single virtual table. The views can act as aggregated tables, where the database engine aggregates data, for example, sum, average etc, and presents the calculated results as part of the data. The views can hide the complexity of data by transparently partitioning the actual underlying table.

Also the views may take very little space to store in the database as only a definition of a view needs to be stored and not a copy of all the data it presents. A historical view is not a virtual view as a historical view is a combination of data block copies to present a view of data at a recovery point. The significance of this distinction is that a virtual view does not require the combination of data block copies. As a result, the historical view is not the same as a virtual view. Just as functions (in programming) can provide abstraction, so database users can create abstraction by using views.

In another parallel with functions, database users can manipulate nested views, thus one view can aggregate data from other views. Just as rows in a base table lack any defined ordering, rows available through a view do not appear with any default sorting. The view may be a relational table, and/or the relational model may define a table as a set of rows.

In a further example embodiment, a network having a virtualization module (e.g., a virtualization module 104 of FIG. 2) forms a data view around a recovery point (e.g., as specified by an events module 108 of FIG. 4), a recovery module (e.g., a recovery module 106 of FIG. 3) generates a recovery snapshot having an ability to position forward and/or backward from the recovery point when a rolling algorithm (e.g., a rolling algorithm of a delayed roll forward module 302 and/or a delayed roll backward module 304 of FIG. 3) is applied, and an events module (e.g., the events module 108 of FIG. 4) to generate a coalesce policy (e.g., a coalesce policy in a coalescing policies database 404 of FIG. 4) around the recovery point (e.g., as specified by the events module 108 of FIG. 4) to reduce a storage requirement.

Figure 8:
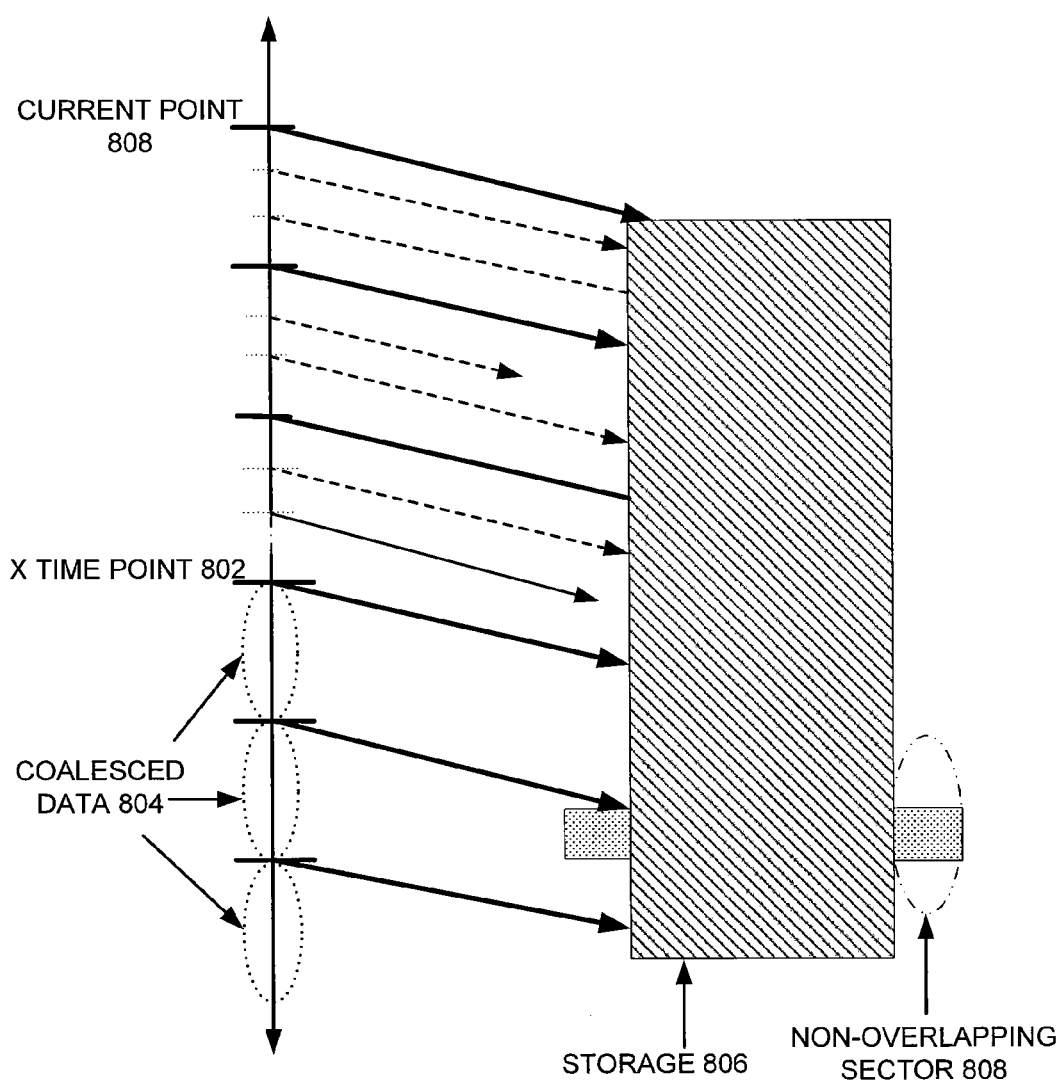
FIG. 8 is a graphical view of a coalesce process, according to one embodiment.

In a further embodiment, a method includes determining a temporal window based on at least one of a user data and an automatically generated data, coalescing data between events prior to the temporal window, and capturing data between events after the temporal window (e.g., as illustrated in FIG. 8). The coalescing data between events prior to the temporal window may be determined by a set of overlapping operations to a data set, wherein certain operations have non-overlapping sectors which are not coalesced.

Figure 1:
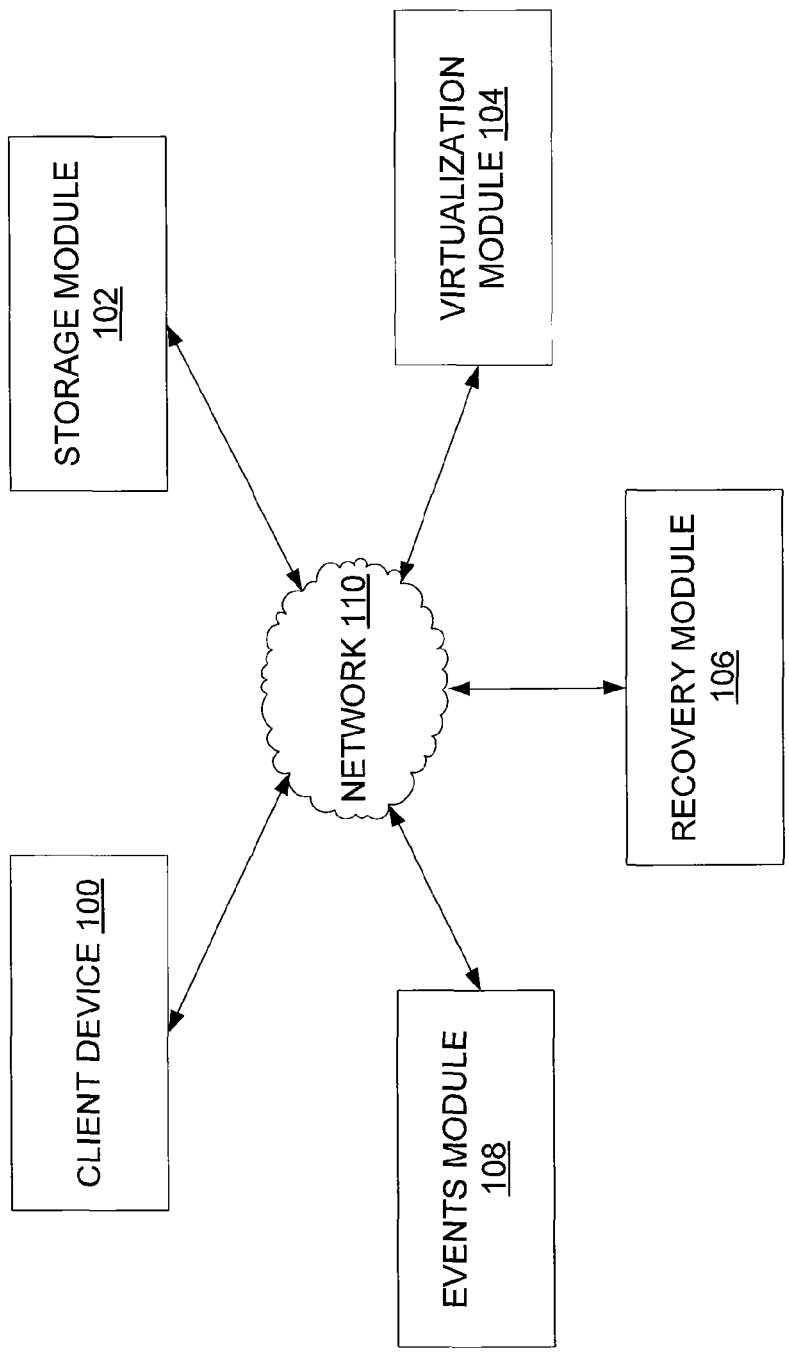
FIG. 1 is a system view of a virtualization module, a recovery module, that communicates with a client device, an events module, and/or a storage module through a network, according to one embodiment.

FIG. 1 is a system view of a virtualization module 104, a recovery module 106, that communicates with a client device 100, an events module 108, and/or a storage module 102 through a network 110, according to one embodiment.

A client device (e.g., the client device 100) may be an end user device (e.g., a customer interface, a system administrator control device, and/or a technical support device, etc.). A storage module (e.g., the storage module 102) may be a volatile storage (e.g., DRAM, RDRAM, and/or SRAM, etc.) and/or a non-volatile storage (e.g., hard disk drive, RAID array, SCSI drive, SATA drive, magnetic tape, CD, and/or DVD, etc.). A network (e.g., the network 110) may be a LAN, WAN, and/or an Internet. A virtualization module (e.g., the virtualization module 104) is best understood with reference to FIG. 2, as will later be described. The recovery module 106 may also be best understood with reference to FIG. 3, and the events module 108 may best be understood with reference to FIG. 4.

In another embodiment, the client device 100 may generate a data operation (e.g., a data storage, a data backup, a data retrieval, a data modification, a data transfer, etc.) request through the network 110 (e.g., LAN, WAN, and/or Internet, etc.). For example, the client device 100 may define an event (e.g., midnight, every 5 minutes, system crash, configuration change, failed log-in, and/or as indicated by the events module 108 of FIG. 1, etc.) through communicating with the events module 108. The client device 100 may also generate a request for backup via communication with the recovery module 106. A data backed up by the recovery module 106 may be stored in the storage module 102.

The recovery module 106 may also provide a mechanism to continuously backup data as well as a means to access data points relative to a reference data point.

The reference data point may be associated with an event (e.g., midnight, every 5 minutes, system crash, configuration change, failed log-in, and/or as indicated by the events module 108 of FIG. 1, etc.) stored in the events module 108. Before a data point associated with the event (e.g., midnight, every 5 minutes, system crash, configuration change, failed log-in, and/or as indicated by the events module 108 of FIG. 1, etc.) is accessed, the virtualization module 104 may generate a data view (e.g., a virtual view) such that the original data may not need to be modified.

An example embodiment provides methods and systems to form (e.g., formed by the virtualization module 106) a data view (e.g., a virtual view, an original view, etc.) around a recovery point (e.g., midnight, every 5 minutes, system crash, configuration change, failed log-in, and/or as specified in the events module 108 etc.) and shift the data view (e.g., a virtual view, an actual view, etc.) around the recovery point through a direction-agnostic roll algorithm that uses a roll-forward algorithm (e.g., to roll to a data state that occurred later in time than the reference data, etc.) to shift the data view (e.g., a virtual view, an actual view, etc.) to a time after the recovery point (e.g., midnight, every 5 minutes, system crash, configuration change, failed log-in, and/or as specified in the events module 108 etc.) and/or a roll-backward algorithm (e.g., to roll to the data state that occurred earlier in time than the reference data, etc.) to shift the data view (e.g., a virtual view, an original view, etc.) to a time before the recovery point (e.g., midnight, every 5 minutes, system crash, configuration change, failed log-in, and/or as specified in the events module 108 etc.).

Another example embodiment provides methods and systems to generate a recovery snapshot (e.g., to generate a virtual snapshot with the virtualization module 104, etc.) at a predetermined interval (e.g., midnight, every 5 minutes, system crash, configuration change, failed log-in, and/or as indicated by the events module 108 of FIG. 1, etc.) to retain an ability to position forward (e.g., to roll to a data state that occurred later in time than the reference data, etc.) and/or backward (e.g., to roll to the data state that occurred earlier in time than the reference data, etc.) when a delayed roll back algorithm is applied, and create a virtual view (e.g., create a virtual view using the virtualization module 104, etc.) of the recovery snapshot using an algorithm (e.g., a continuous recovery algorithm of the recovery module 106) tied to an original data, a change log data, and a consistency data related to an event (e.g., midnight, every 5 minutes, system crash, configuration change, failed log-in, and/or as indicated by the events module 108 of FIG. 1, etc.).

A further example embodiment includes a virtualization module 104 to form a data view (e.g., a virtual view, an actual view, etc.) around a recovery point (e.g., midnight, every 5 minutes, system crash, configuration change, failed log-in, and/or as specified in the events module 108, etc.), and/or an events module 108 to generate a coalesce policy (e.g., to retain data every 5 minutes for data that is older than 10 years, to retain data every 2 minutes for data that is less than 10 years old, etc.) around the recovery point (e.g., midnight, every 5 minutes, system crash, configuration change, failed log-in, and/or as specified in the events module 108, etc.) to reduce a storage requirement (e.g., to decrease a storage capacity requirement of the storage module 102). The generated coalesce policy may be used (e.g., used by the recovery module 106) to coalesce (e.g., combine, compile, etc.) backed up data to optimize storage requirements.

Figure 2:
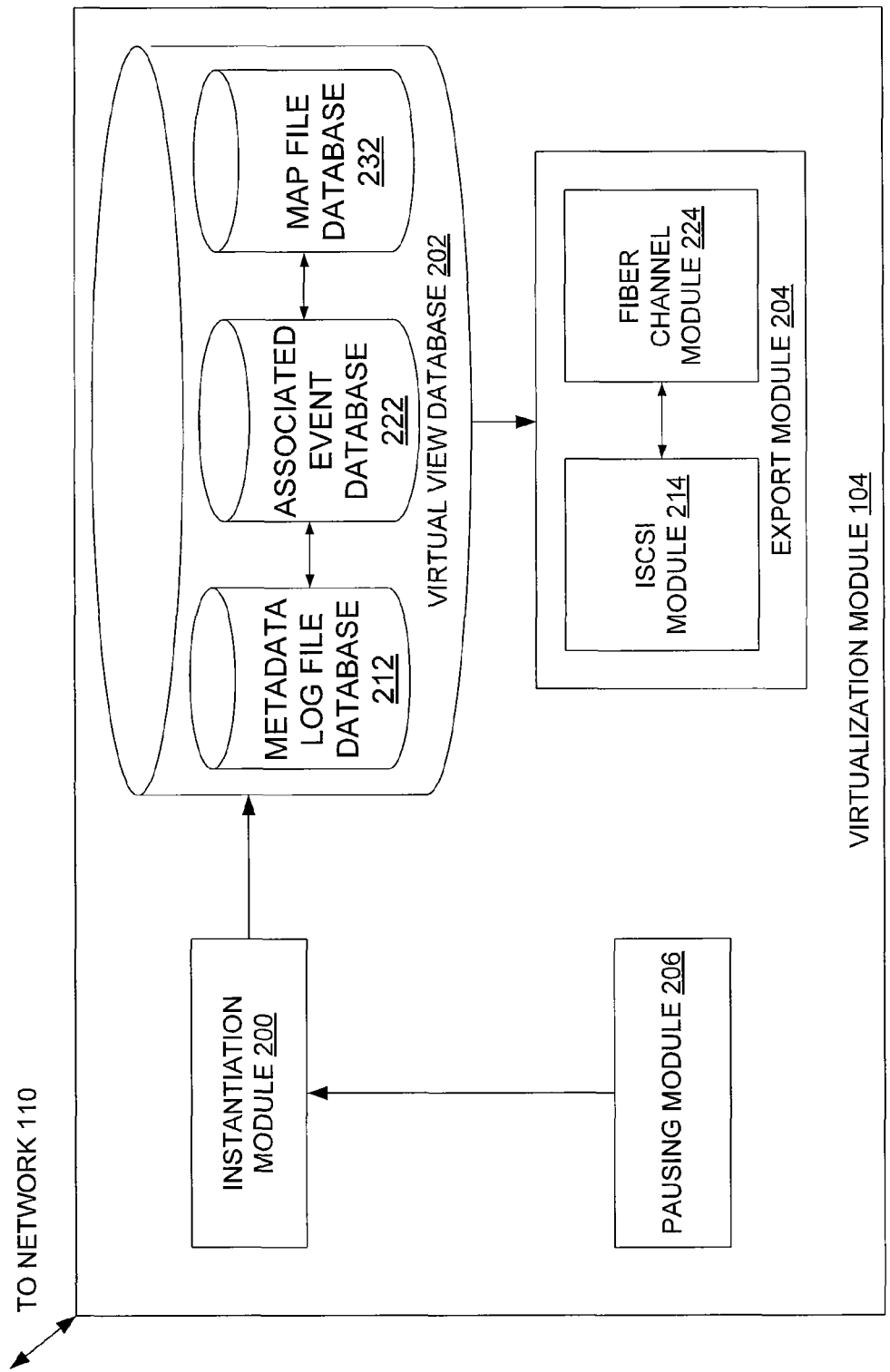
FIG. 2 is an exploded view of the virtualization view module of FIG. 1 having an instantiation module, a pausing module, a virtual view database having a metadata log file database, an associated event database, and/or a map file database, and/or an export module having an iSCSI module, and/or a fiber channel module, according to one embodiment.

FIG. 2 is an exploded view of the virtualization module 104 of FIG. 1 having an instantiation module 200, a pausing module 206, a virtual view database 202 that may include a metadata log file database 212, an associated event database 222, and/or a map file database 232, and/or an export module 204 having an iSCSI module 214, and/or a fiber channel module 224, according to one embodiment.

The instantiation module 200 may be a circuit and/or a piece of software code that generates a virtual view of a data state. The instantiation module 200 may communicate with the pausing module 206 to determine when the virtual view should be generated to ensure validity and/or accuracy. The instantiation module 200 may also communicate the generated virtual view to the virtual view database 202 to be stored.

According to one embodiment, the virtual view may be instantiated by an instantiation module (e.g., the instantiation module 200) of the virtual view module 104. The virtual view may be generated after a data operation and/or a client operation (e.g., a client operation of the client device 100 of FIG. 1) has been suspended and/or paused (e.g., paused by the pausing module 206) to ensure a validity and/or accuracy of the virtual view generated. After the virtual view has been generated by the instantiation module 200, the virtual view may be stored in a database (e.g., the virtual view database 202, etc.).

In one embodiment, a data view (e.g., a snapshot view) may be formed to prevent losing an ability to roll forward and/or backward when a delayed roll backward algorithm is applied. Any number of snapshot views may be taken. However to generate and/or to store a snapshot view may be time and/or capacity consuming. As such, a virtual view of the data may be generated (e.g., generated by the instantiation module 200 of the virtual view module 104 of FIG. 1) rather than making a full snapshot view of the data.

In a further embodiment, the database (e.g., the virtual view database 202) may contain additional databases to store a meta data log file (e.g., the metadata log file database 212), an associated event (e.g., the associated event database 222), and/or a map file (e.g., the map file database 232). A relevant information mapping information (e.g., a map file) of associating an original data to the data view (e.g., a virtual view, a real view, and/or a snapshot view, etc.) may be stored in the map file database 232 of the virtual view database 202. A log file (e.g., a meta data log f le) documenting change (e.g., time stamp of changes, location of changes, time offset of changes, etc.) of the data view (e.g., a virtual view, a real view, and/or a snapshot view, etc.) may be stored in the metadata log file database 212. The log file may also be stored as a normal file on a file system using a relational database (e.g., an SQL database). As used herein, the term "relational database" refers to an integrated collection of logically related records or files consolidated into a common pool that provides data for one or more multiple uses. A relational database may match data by using common characteristics found within the data set. For example, a data set containing all the real-estate transactions in a town can be grouped by the year the transaction occurred, or it can be grouped by the sale price of the transaction, or it can be grouped by the buyer's last name, and so on.

The grouping uses the relational model. A relational model may describe a database as a collection of predicates over a finite set of predicate variables, describing constraints on the possible values and combinations of values. The content of the database at any given time may be a finite (logical) model of the database, i.e. a set of relations, one per predicate variable, such that all predicates are satisfied. A request for information from the database (a database query) may be also a predicate. The storing of envelope information is not a relational database because envelope information includes metadata describing the location of the data block in the primary storage and the information associated with the order in which the data blocks are created is preserved.

The significance of this distinction is that the relational database does not require information associated with the order in which the data blocks are created to be preserved. As a result, the storing of envelope information is not the same as a relational database. A relational model applied to a database may includes one or more characteristics including but not limited to a type, an attribute, a tuple, and/or a relation. The type as used in a relational database might be the set of integers, the set of character strings, the set of dates, or the two boolean values true and false, and so on. The corresponding type names for these types might be the strings "int", "char", "date", "boolean", etc. The relational theory may not dictate what types are to be supported. Attribute is the term used in the theory for what may be referred to as a column.

A table data structure may be specified as a list of column definitions, each of which specifies a unique column name and the type of the values that are permitted for that column. An attribute value may be the entry in a specific column and row, such as "John Doe" or "35". The tuple may be a row, except in an SQL DBMS, where the column values in a row are ordered. The tuples may not be ordered; instead, each attribute value may be identified by the attribute name instead of its ordinal position within the tuple. An attribute name might be "name" or "age". The relation may be a table structure definition, for example, a set of column definitions, along with the data appearing in that structure. The structure definition may be the heading and the data appearing in it may be the body, a set of rows. A database relvar (relation variable) may be a base table.

The heading of the assigned value of the database relvar at any time is as specified in the table declaration and its body is that most recently assigned to it by invoking some update operator, for example, insert, update, or delete. The heading and body of the table resulting from evaluation of some query are determined by the definitions of the operators used in the expression of that query. The heading may not always be a set of column definitions as described above, because it may be possible for a column to have no name and also for two or more columns to have the same name. Also, the body may not always be a set of rows because it is possible for the same row to appear more than once in the same body.

In yet another embodiment, the virtual view database 202 may communicate with the instantiation module 200 to receive, store, and/or update a data (e.g., the metadata log file, an associated event, and/or a map file, etc.) of the virtual view to ensure that the virtual view remains updated and/or valid. The virtual view database 202 may also transfer the virtual view to the export module 204 having an iSCSI interface (e.g., an iSCSI interface of the iSCSI module 214) and/or a fiber channel interface (e.g., a fiber channel interface of the fiber channel module 224) to automatically transfer the virtual view to an external storage device (e.g., a storage device 102 of FIG. 1).

For example, the data view (e.g., a virtual view, a real view, and/or a snapshot view, etc.) generated (e.g., generated by the instantiation module 200 of the virtual view module 104 of FIG. 1) may also be automatically and/or manually exported via an iSCSI interface (e.g., the iSCSI module 214) and/or a fiber channel interface (e.g., the fiber channel module 224) of an export interface (e.g., the export module 104). As such, each virtual view may be backed up as necessary and/or used for rolling data backward and/or forward in the recovery module 106 of FIG. 1.

In one embodiment, the virtualization module 104 may form a data view (e.g., a virtual view, a real view, and/or a snapshot view, etc.) around a recovery point (e.g., midnight, every 5 minutes, system crash, configuration change, failed log-in, and/or as indicated by the events module 108 of FIG. 1, etc.). The pausing module 206 may temporarily suspend an activity of a client device (e.g., a client device 100 of FIG. 1) before the instantiation module 200 generates a data view (e.g., a virtual view, a real view, and/or a snapshot view, etc.). The pausing module 206 may restart the operation of the client device (e.g., the client device of FIG. 1) after the data view (e.g., a virtual view, a real view, and/or a snapshot view, etc.) has been generated.

In another example embodiment, an event associated with a generation of the data view (e.g., a virtual view, a real view, and/or a snapshot view, etc.) may be stored in the associated event database 222. Additionally, the data view (e.g., a virtual view, a real view, and/or a snapshot view, etc.) may be exported through the iSCSI module 214 and/or the fiber channel module 224 of the export module 214.

In another embodiment, the virtualization module 104 may form the data view (e.g., a virtual view, a real view, and/or a snapshot view, etc.) around a recovery point (e.g., midnight, every 5 minutes, system crash, configuration change, failed log-in, and/or as indicated in the events module 108 of FIG. 1, etc.). The virtualization module 104 may also determine that a data integrity (e.g., unaltered, unmodified, and/or not destroyed, etc.) is consistent at the recovery point by examining data and meta-data associated with the recovery point (e.g., midnight, every 5 minutes, system crash, configuration change, failed log-in, and/or as indicated in the events module 108 of FIG. 1 etc.).

The virtualization module 104 of FIG. 1 may maintain a data adjacent to the recovery point (e.g., midnight, every 5 minutes, system crash, configuration change, failed log-in, and/or as indicated in the events module 108 of FIG. 1, etc.) in a log data structure.

In yet another embodiment, the creation of a virtual view may be specific to a kernel. A drive in the kernel (e.g., piece of software responsible for providing secure access to the machine's hardware to various computer programs) may create a volume object that appears to be a real volume and access requests (e.g., a read, and/or a write request, etc.) to the virtual view may be handled by a kernel space code. A retention log of the virtual view may then be referenced to complete the access requests (e.g., the read, and/or the write request, etc.).

A data may be stored in a binary-tree based lookup table to optimize access speed due to a constant time lookup algorithm. As used herein the term "binary tree" refers to a tree data structure in which each node has at most two children. The first node may be known as the parent and the child nodes are called left and right. In type theory, a binary tree with nodes of type A may be defined inductively as TA=μα. 1+A× α×α. Binary trees are used to implement binary search trees and binary heaps. A binary tree may be a connected acyclic graph such that the degree of each vertex is no more than 3.

It can be shown that in any binary tree, there are exactly two more nodes of degree one than there are of degree three, but there can be any number of nodes of degree two. A rooted binary tree may be such a graph that has one of its vertices of degree no more than 2 singled out as the root. With the root thus chosen, each vertex may have a uniquely defined parent, and up to two children. Additionally, a binary tree may be a single vertex or a graph formed by taking two binary trees, adding a vertex, and adding an edge directed from the new vertex to the root of each binary tree. This may not establish the order of children, but may fix a specific root node. A branching data structure is not a binary tree because the branching data structure organizes and maps a hierarchical relationship. The significance of this distinction is that the binary-tree format does not require a hierarchical relationship. As a result, the branching data structure is not the binary tree.

In another embodiment, the virtualization module 104 of FIG. 1 may create a virtual view of a recovery snapshot using an algorithm tied to an original data, a change log data, and a consistency data related to an event (e.g., midnight, every 5 minutes, system crash, configuration change, failed log-in, and/or as indicated in the events module 108 of FIG. 1, etc.). The virtualization module 104 may also redirect the access request (e.g., the read, and/or the write request) to the original based on a meta-data information provided in the virtual view. The virtualization module 104 may also substantially retain a timestamp data, a location of a change, and a time offset of the change as compared with the original data (e.g., originally saved data, an originally backed up data, etc.).

The virtualization module 104 may utilize a relational database (e.g., SQL database) to process the change log data in a meta-data format (e.g., through the metadata log file database 212), and to process other on-disk data using a binary-tree format. The virtual view may be specific to a volume object in a kernel (e.g., piece of software responsible for providing secure access to the machine's hardware to various computer programs) that imitates another volume having the original data. A volume having original data may be a database clone. A database clone may be a complete and separate copy of a database system that includes the business data, the DBMS software and any other application tiers that make up the environment. Cloning may be a different kind of operation to replication and backups in that the cloned environment is both fully functional and separate in its own right.

Additionally the cloned environment may be modified at its inception due to configuration changes or data subsetting. The cloning may refer to the replication of the server in order to have a backup, to upgrade the environment. A primary storage is not a volume having original data because a primary storage stores data blocks, which are copies of data from a production host. The significance of this distinction is that a volume having original data does not require the storing of copies of data from a production host. As a result, the primary storage is not the volume having original data. The virtual view may also be managed by a kernel space (e.g., piece of software responsible for providing secure access to the machine's hardware to various computer programs) that processes an access request through at least one table using a meta-data (e.g., the metadata file database 212) created in a retention log. The virtual view may be exported as a virtual volume by the export module 204 using the iSCSI module 214 and/or the fiber channel module 224 to transport to an external processing device (e.g., a computer, a PDA, and/or a storage module 102, etc.).

Furthermore, the virtualization module 104 may apply the change log data of the virtual view database 202 when the virtual view is unfrozen (e.g., unfrozen by the pausing module 206) after a user session reaches a level state. The virtual view may be unfrozen after a user session reaches a level state to be appropriated updated through modifications of the virtual view database 202. Hence a metadata index of the metadata log file database 212 may need to be updated continuously. A map file of the map file database 232 may also need to be updated while the virtual view is being created (e.g., by the instantiation module 200) and/or after it has been created. The updates and/or modifications of the map file (e.g., the map file of the map file database 232) and/or the log file (e.g., the log file of the metadata log file database 212) may be necessary to ensure that the virtual view maintains a relevant representation of the original data.

In a further embodiment, a series of indexes (e.g., using indexes to improve query performance) of the virtual view may be generated by the virtualization module 104 to enable a linking to an event description (e.g., content-based description) of the virtual view rather than to an actual data in the original data. The event description of the virtual view may (e.g., stored in the associated events database 222) may allow the series of indexes to locate the virtual views by a content located within the virtual view. The data view (e.g., a virtual view, a real view, and/or a snapshot view, etc.) may also be automatically communicated to the export module 204 to transport the virtual view to a backup tape (e.g., magnetic tape, external hard disk drive, CD, DVD, etc.) to provide extended data retention using a lifecycle management policy. Therefore, older data may be retroactively transferred from the storage module 102 for storage space maintenance.

FIG. 3 is an exploded view of the recovery module 106 of FIG. 1 having a continuous data protection module 300, a delayed roll forward module 302, a delayed roll backward module 304, and/or a coalescing module 306, according to one embodiment.

The continuous protection module 300 may provide continuous backup mechanism (e.g., recording every change made to a data) to a set of data. The continuous protection module 300 may communicate with a storage module (e.g., a storage module 102 of FIG. 1), a client device (e.g., the client device 100 of FIG. 1), and/or an events module (e.g., the events module 108 of FIG. 1) to automatically detect a data change and/or to automatically save the data change.

The delayed roll forward module 302 may communicate with a storage module (e.g., the storage module 102 of FIG. 1) to perform a roll forward operation on a stored data. The delay roll forward module 302 may also communicate with an events module (e.g., the events module 108 of FIG. 1) to associate a data state with a specified event (e.g., midnight, every 5 minutes, system crash, configuration change, failed log-in, and/or as indicated in the events module 108 of FIG. 1 etc.).

The delayed roll backward module 304 may communicate with a storage module (e.g., the storage module 102 of FIG. 1) to perform a roll backward operation on a stored data. The delay roll backward module 302 may also communicate with an events module (e.g., the events module 108 of FIG. 1) to associate a data state with a specified event (e.g., midnight, every 5 minutes, system crash, configuration change, failed log-in, and/or as indicated in the events module 108 of FIG. 1 etc.).

The delayed roll forward module 302 may roll a data to a state corresponding to an event that happened later in time than an event (e.g., midnight, every 5 minutes, system crash, configuration change, failed log-in, and/or as indicated in the events module 108 of FIG. 1, etc.) associated with a reference data. The delayed roll backward module 304 may roll the data to a state corresponding to the event (e.g., midnight, every 5 minutes, system crash, configuration change, failed log-in, and/or as indicated in the events module 108 of FIG. 1, etc.) that happened earlier in time than the event associated with the reference data.

The recovery module 106 of FIG. 1 may also allow backed up data to be accessed before a recovery point (e.g., midnight, every 5 minutes, system crash, configuration change, failed log-in, and/or as indicated in the events module 108 of FIG. 1, etc.) through the delayed roll backward module (e.g., the delayed roll backward module 304) and/or after the certain recovery point through the delayed roll forward module (e.g. the delayed roll forward module 302). The recovery point may be tied to an event (e.g., midnight, every 5 minutes, system crash, configuration change, failed log-in, and/or as indicated by the events module 108 of FIG. 1, etc.).

A coalescing module (e.g., the coalescing module 306) may use a coalescing events and/or a coalescing policies as specified in the events module 108 of FIG. 1 to coalesce (e.g., combine, compile, etc.) backed up data to optimize storage requirements. The coalescing module (e.g., the coalescing module 306) may communicate with an events database (e.g., an events database of the events module 108 of FIG. 1) to determine the event around which data should be collapsed (e.g., coalesced, combined, etc.).

In one embodiment, the delayed roll forward module 302 and/or the delayed roll backward module 304 may shift a data view (e.g., a virtual view, a real view, and/or a snapshot view, etc.) around the recovery point (e.g., midnight, every 5 minutes, system crash, configuration change, failed log-in, and/or as indicated by the events module 108 of FIG. 1, etc.) through a direction-agnostic roll algorithm that uses a roll forward algorithm to shift the data view to a time after the recovery point (e.g., midnight, every 5 minutes, system crash, configuration change, failed log-in, and/or as indicated by the events module 108 of FIG. 1, etc.) and/or a roll backward algorithm to shift the data view (e.g., a virtual view, a real view, and/or a snapshot view, etc.) to a time before the recovery point.

The recovery point (e.g., midnight, every 5 minutes, system crash, configuration change, failed log-in, and/or as indicated by the events module 108 of FIG. 1, etc.) may be associated with an automatically generated event, a user definable event, and/or a prepackaged event. Additionally, the continuous protection module 300 may generate a recovery snapshot at a predetermined interval (e.g., midnight, every 5 minutes, etc.) to retain an ability to position forward and/or backward when a delayed roll backward algorithm is applied.

In a next embodiment, the coalescing module 306 may coalesce data around the recovery point (e.g., midnight, every 5 minutes, system crash, configuration change, failed log-in, and/or as indicated by the events module 108 of FIG. 1, etc.) and other determinable recovery points at a threshold interval to reduce storage requirements. In addition, the coalescing module 306 may retain different quantities of data around the recovery point (e.g., midnight, every 5 minutes, system crash, configuration change, failed log-in, and/or as indicated by the events module 108 of FIG. 1, etc.) based on a programmatic methodology that considers space utilization and a data consistency associated with the time after the recovery point and/or the time before the recovery point. For example, more data points may be retained for data accumulated 5 days ago whereas less data points may be retained for data accumulated 5 years ago.

FIG. 4 is an exploded view of the events module 108 of FIG. 1 having a trigger database 400 having a time based database 410 and/or an event based database 420, a coalescing events database 402, a coalescing policies database 404, a flag depository database 406, and/or an event detector module 408, according to one embodiment.

In one example embodiment, the trigger database 400 may store any backup triggering event. The backup triggering event may be time based (e.g., stored in the time based database 410) and/or event based (e.g., stored in the event based database 420). The coalescing events database may communicate with a coalescing module (e.g., a coalescing module 306 of FIG. 3) to determine an event corresponding to a data collapsing. The coalescing policies database 404 may also communicate with the coalescing module 306 of FIG. 3 to govern an age dependent data retaining mechanism. For example, older data may be retained with less data points. The flag depository database 406 may communicate with the trigger database 400, the storage database 102 of FIG. 1, and/or the continuous data protection module 300 of FIG. 3 to store a flag indicating a data state associated with an event as specified in the events module 108 of FIG. 1 at which data was backed up. The event detector module 408 may detect a user definable event and/or an automatically generated event by communicating with a client device 100, the trigger database 400, the coalescing events database 402, and/or the coalescing policies database 404. The user definable event may be communicated by a client device (e.g., the client device 100 of FIG. 1). The events detected by the event detector module 408 may then be stored in the trigger database 400 and stored in the time based database 410 if an event is time based (e.g., midnight, every 5 minutes, etc.), and stored in the event based database 420 if the event is event based e.g., system crash, configuration change, failed log-in, and/or as indicated by the events module 108 of FIG. 1, etc.).

In another example embodiment, the events module (e.g. the events module 108 of FIG. 1) may also communicate with a recovery module (e.g., the recovery module 106 of FIG. 1) to associate data points with events (e.g., midnight, every 5 minutes, system crash, configuration change, failed log-in, and/or as indicated by the events module 108 of FIG. 1, etc.). As such the recovery module (e.g., the recovery module 106 of FIG. 1) may perform relevant operations (e.g., a delayed roll forward of the delayed roll forward module 302, a delayed roll backward of the delayed roll backward module 304, and/or coalescing of the coalescing module 306 of FIG. 3, etc.) based on an associated event.

The event detector module 408 of the events module 108 may also detect coalescing events defined by a user and/or automatically generated. The coalescing events may be stored in the coalescing events database 402. In another embodiment, the events module 108 may generate a coalescing policy (e.g., number of data points retained for different time periods, etc.) around the recovery point (e.g., midnight, every 5 minutes, system crash, configuration change, failed log-in, and/or as indicated by the events module 108 of FIG. 1, etc.) to reduce a storage requirement. The coalescing policy may be stored in the coalescing policy database 404.

In one embodiment, the event detector module 408 may generate a marking data (e.g., a flag, a bookmark, etc.) at the recovery point (e.g., midnight, every 5 minutes, system crash, configuration change, failed log-in, and/or as indicated by the events module 108 of FIG. 1, etc.) to enable the direction-agnostic roll algorithm (e.g., a roll-forward algorithm (e.g., to roll to a data state that occurred later in time than the reference data, etc.) and/or a roll-backward algorithm (e.g., to roll to the data state that occurred earlier in time than the reference data, etc.)) to operate and to reduce a recovery time objective (e.g., to minimize the time to recovery in case of system malfunction) when an algorithm is applied. The marking data (e.g., a flag, a bookmark, etc.) may be stored in the flag depository database 406.

Figure 5:
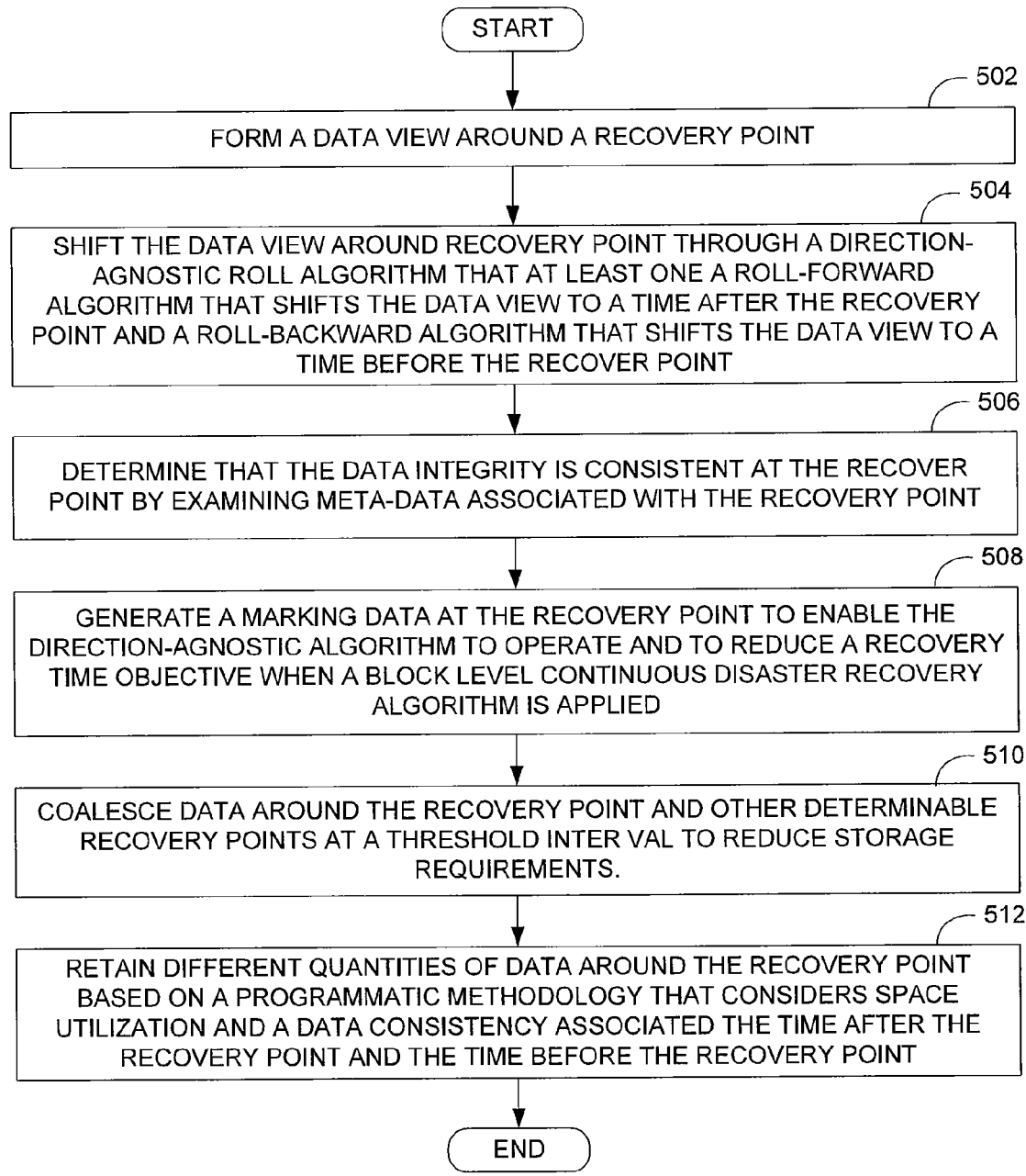
FIG. 5 is a process flow to form a data view around a recovery point, according to one embodiment.

FIG. 5 is a process flow to form a data view around a recovery point, according to one embodiment. In operation 502, the data view (e.g., a virtual view, a real view, and/or a snapshot view, etc.) may be formed (e.g., formed by the virtual view module 104 of FIG. 2) around a recovery point (e.g., midnight, every 5 minutes, system crash, configuration change, failed log-in, and/or as indicated by the events module 108 of FIG. 1, etc.). In operation 504, the data view may be shifted (e.g., shifted by the delayed roll forward module 302 and/or the delayed roll backward module 304 of FIG. 3) around the recovery point (e.g., midnight, every 5 minutes, system crash, configuration change, failed log-in, and/or as indicated by the events module 108 of FIG. 1, etc.) through a direction agnostic roll algorithm that uses at least one of a roll-forward algorithm (e.g., to roll to a data state that occurred later in time than the reference data, etc.) to shift the data view (e.g., a virtual view, a real view, and/or a snapshot view, etc.) to a time after the recovery point (e.g., midnight, every 5 minutes, system crash, configuration change, failed log-in, and/or as indicated by the events module 108 of FIG. 1, etc.) and a roll-backward algorithm (e.g., to roll to the data state that occurred earlier in time than the reference data, etc.) to shift the data view (e.g., a virtual view, a real view, and/or a snapshot view, etc.) to a time before the recovery point (e.g., midnight, every 5 minutes, system crash, configuration change, failed log-in, and/or as indicated by the events module 108 of FIG. 1, etc.).

In operation 506, a data integrity may be determined to be consistent (e.g., complete, valid, etc.) at the recovery point e.g., midnight, every 5 minutes, system crash, configuration change, failed log-in, and/or as indicated by the events module 108 of FIG. 1, etc.) by examining data and meta-data associated with the recovery point. In operation 508, a marking data (e.g., a flag, a bookmark, etc.) may be generated (e.g., generated by the recovery module 106 of FIG. 1) at the recovery point (e.g., midnight, every 5 minutes, system crash, configuration change, failed log-in, and/or as indicated by the events module 108 of FIG. 1, etc.) to enable the direction-agnostic roll algorithm (e.g., a roll forward algorithm of the delayed roll forward module 302 of FIG. 3, and/or a roll backward algorithm of the delayed roll backward module 304 of FIG. 3, etc.) to operate and to reduce a recovery time objective (e.g., a time required to recover from a system failure, etc.) when an algorithm is applied.

In operation 510, data may be coalesced (e.g., coalesced by the coalescing module 306 of FIG. 3) around the recovery point (e.g., midnight, every 5 minutes, system crash, configuration change, failed log-in, and/or as indicated by the events module 108 of FIG. 1, etc.) and other determinable recovery points at a threshold interval to reduce storage requirements. In operation 512, differing quantities of data may be retained around the recovery point (e.g., midnight, every 5 minutes, system crash, configuration change, failed log-in, and/or as indicated by the events module 108 of FIG. 1, etc.) based on a programmatic methodology that considers space utilization and a data consistency associated with the time after the recovery point (e.g., midnight, every 5 minutes, system crash, configuration change, failed log-in, and/or as indicated by the events module 108 of FIG. 1, etc.) and the time before the recovery point.

Figure 6:
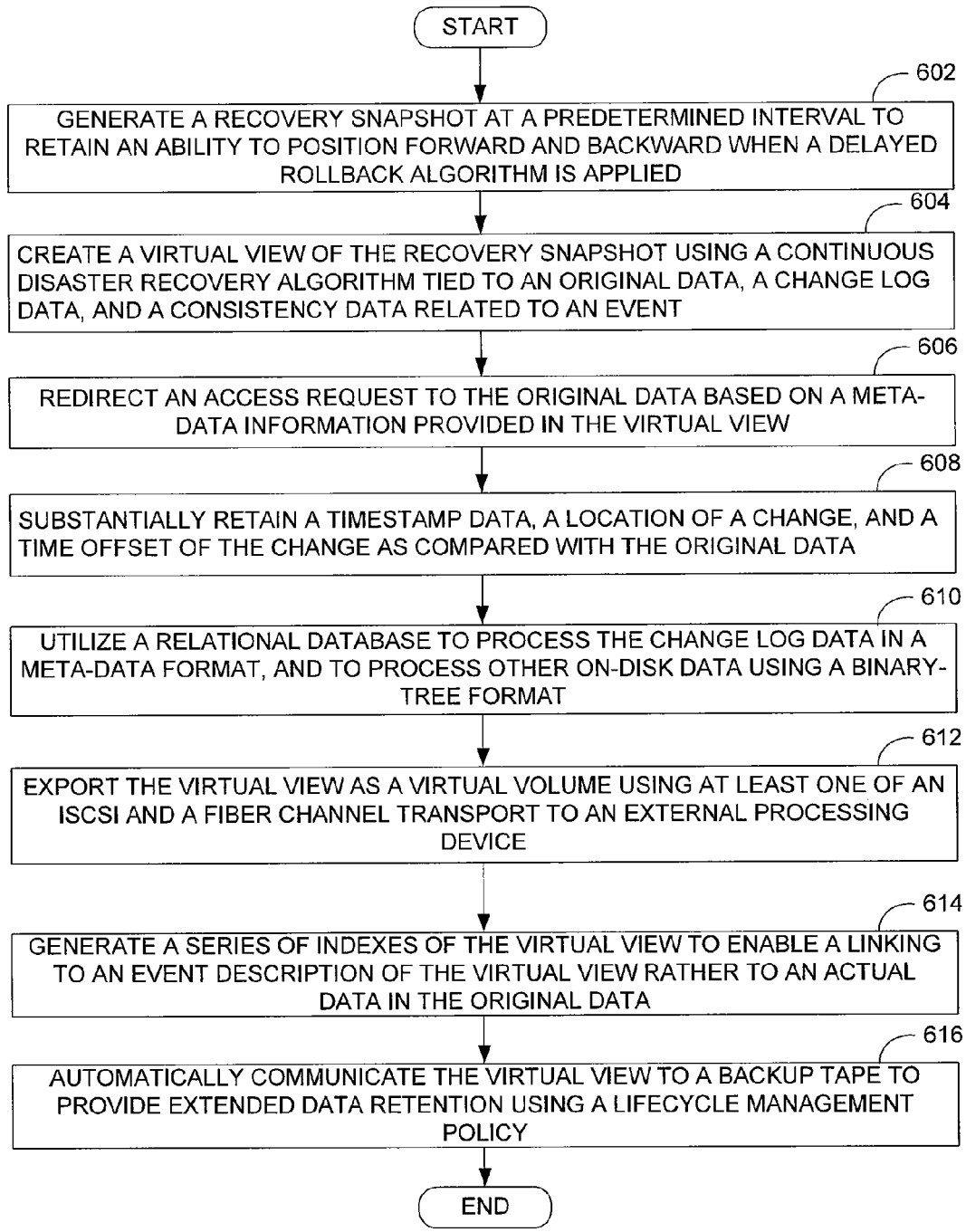
FIG. 6 is a process flow to generate a recovery snapshot at a predetermined interval to retain an ability to position forward and backward when a delayed roll back algorithm is applied, according to one embodiment.

FIG. 6 is a process flow to generate a recovery snapshot at a predetermined interval to retain an ability to position forward and backward when a delayed roll back algorithm (e.g., the delayed roll back algorithm of the delayed roll backward module 304 of FIG. 3) is applied, according to one embodiment.

In operation 602, a recovery snapshot may be generated at a predetermined interval (e.g., midnight, every 5 minutes, etc.) to retain an ability to position forward and backward when a delayed roll back algorithm (e.g., the delayed roll back algorithm of the delayed roll backward module 304 of FIG. 3) is applied. In operation 604, a virtual view of the recovery snapshot may be created using an algorithm (e.g., the continuous disaster recovery algorithm of the continuous data protection module 300 of FIG. 3) tied to an original data, a change log data, and a consistency data related to an event (e.g., midnight, every 5 minutes, system crash, configuration change, failed log-in, and/or as indicated by the events module 108 of FIG. 1, etc.). In operation 606, an access request to the original data may be redirected based on a meta-data information provided in the virtual view. In operation 608, a timestamp data, a location of a change, and a time offset of the change as compared with the original data may be substantially retained.

In operation 610, a relational database (e.g., SQL database) may be utilized to process the change log data in a meta-data format (e.g., the change log data of a metadata log file database 212 of FIG. 212), and to process other on-disk data using a binary-tree format. In operation 612, the virtual view (e.g., the virtual view stored in the virtual view database 202 of FIG. 2) may be exported as a virtual volume using at least one of an iSCSI (e.g., the iSCSI module 214 of FIG. 2) and a fiber channel (e.g., the fiber channel module 224 of FIG. 2) transport to an external processing device. In operation 614, a series of indexes of the virtual view may be generated (e.g., the virtual view generated by the instantiation module 200 of FIG. 2) to enable a linking to an event description (e.g., midnight, every 5 minutes, system crash, configuration change, failed log-in, and/or as indicated by the events module 108 of FIG. 1, etc.) of the virtual view rather than to an actual data in the original data.

In operation 616, the virtual view may be automatically communicated (e.g., communicated by the export module 204 of FIG. 2) to a backup tape (e.g., through an iSCSI interface (e.g., the iSCSI module 214) and/or a fiber channel interface (e.g., the fiber channel module 224) of FIG. 2) to provide extended data retention using a lifecycle management policy.

Figure 7:
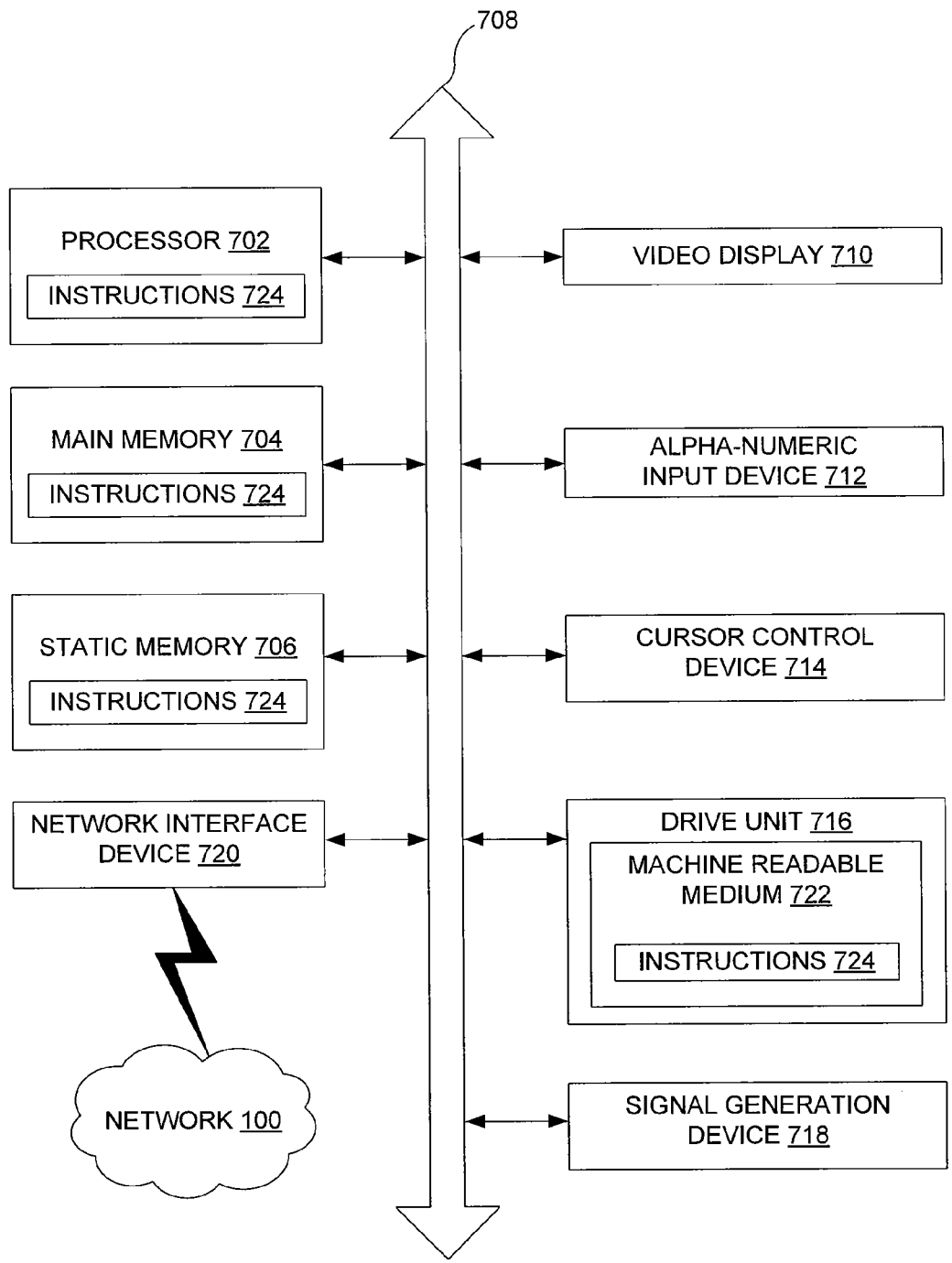
FIG. 7 is a diagrammatic representation of a machine in the form of a data processing system within which a set of instructions, for causing the machine to perform any one or more of the methodologies discussed herein, may be executed, according to one embodiment.

FIG. 7 shows a diagrammatic representation of a machine in the example form of a computer system 700 within which a set of instructions, for causing the machine to perform any one or more of the methodologies discussed herein, may be executed. In various embodiments, the machine operates as a standalone device and/or may be connected (e.g., networked) to other machines. In a networked deployment, the machine may operate in the capacity of a server and/or a client machine in server-client network environment, and/or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specie actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 700 includes a processor 702 (e.g., a central processing unit (CPU) a graphics processing unit (GPU) and/or both), a main memory 704 and a static memory 707, which communicate with each other via a bus 708. The computer system 700 may further include a video display unit 710 (e.g., a liquid crystal display (LCD) and/or a cathode ray tube (CRT)). The computer system 700 also includes an alphanumeric input device 712 (e.g., a keyboard), a cursor control device 714 (e.g., a mouse), a disk drive unit 717, a signal generation device 718 (e.g., a speaker) and a network interface device 720.

The disk drive unit 717 includes a machine-readable medium 722 on which is stored one or more sets of instructions (e.g., software 724) embodying any one or more of the methodologies and/or functions described herein. The software 724 may also reside, completely and/or at least partially, within the main memory 704 and/or within the processor 702 during execution thereof by the computer system 700, the main memory 704 and the processor 702 also constituting machine-readable media.

The software 724 may further be transmitted and/or received over a network 727 via the network interface device 720. While the machine-readable medium 722 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

FIG. 8 is a graphical view of a coalesce process, according to one embodiment. Particularly, FIG. 8 illustrates a current point 800 (e.g., a current time), a x-time point 802, a coalesced data 804, a storage 806, and a non-overlapping sectors 808. The current point 800 may be the current day, time, and or window in the current temporal period. The x-time point 802 may be a point in time in the past that is automatically determined and/or provided by a user.

The coalesced data 804 may be a data that has been coalesced before the x-time point 802. The storage 806 may be a storage area of coalesced data. The non-overlapping sectors 808 may be data that is outside the coalesce data blocks (e.g., data blocks that are not in a window of blocks that are repeatedly overwritten between events). The darker lines in FIG. 8 may represent a set of events at which data is backed up, and lighter lines (e.g., between the current point 808 and the x-time point 802) may be intermediate backup points that are coalesced after the x-time point.

For example, the period between the current point 800 and the x-time point 802 may be a temporal window based on at least one of a user data and an automatically generated data. Data between events prior to the temporal window (e.g., before the x-time point 802 of FIG. 8) may be coalesced. In addition, data between events after the temporal window may be captured (e.g., as illustrated by the lighter lines after the x-point 802 in FIG. 8). The coalescing data between events prior to the temporal window may be determined by a set of overlapping operations to a data set, wherein certain operations have non-overlapping sectors which are not coalesced (e.g., the non-overlapping sectors 808 may not be coalesced).

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the client device 100, the storage module 102, the virtualization module 104, the recovery module 106, the events module 108, the network module 110, the instantiation module 200, the export module 204, the pausing module 206, the iSCSI module 214, the fiber channel module 224, the continuous data protection module 300, the delayed roll forward module 302, the delayed roll backward module 304, the coalescing module 306, and/or the event detector module 408 may be enabled using transistors, logic gates, and electrical circuits (e.g., application specific integrated ASIC circuitry) using a client device circuit, a storage module circuit, a virtualization circuit, a recovery circuit, an events circuit, a network circuit, an instantiation circuit, an export circuit, a pausing circuit, an iSCSI circuit, a fiber channel circuit, a continuous data protection circuit, a delayed roll forward circuit, a delayed roll backward circuit, a coalescing circuit, and/or an event detector circuit.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

The invention claimed is:

1. A method comprising:
generating, at a predetermined interval, backed up data on a snapshot comprising a read-only copy of a data set frozen at a point in time;
forming a data view of the backed up data around a recovery point associated with an event, wherein the event is at least one of a system crash, a login failure, a configuration change, and an automatic backup operation of data;
shifting the data view around the recovery point through a direction-agnostic roll algorithm configured to utilize a roll-forward algorithm to shift the data view to a time after the recovery point and a roll-backward algorithm to shift the data view to a time before the recovery point, wherein the data view is specific to a volume object in a kernel that imitates another volume having original data and wherein the data view is managed by a kernel space that processes an access request through at least one table using a meta-data created in a retention log;
generating a marking data at the recovery point to enable the direction-agnostic roll algorithm to operate and to reduce a recovery time objective when an algorithm is applied; and
coalescing data around the recovery point and other determinable recovery points at a threshold interval to reduce storage requirements.

2. The method of claim 1, further comprising determining that data integrity is consistent at the recovery point by examining data and meta-data associated with the recovery point.

3. The method of claim 2, further comprising associating the recovery point with at least one of an automatically generated event, a user definable event, and a prepackaged event.

4. The method of claim 3, further comprising maintaining data adjacent to the recovery point in a log data structure that is stored in a file system as a multitude of files.

5. The method of claim 4, further comprising retaining differing quantities of data around the recovery point based on a programmatic methodology that considers space utilization and data consistency associated with the time after the recovery point and the time before the recovery point.

6. A method comprising:
generating, at a predetermined interval, backed up data on a snapshot comprising a read-only copy of a data set frozen at a point in time;
forming a data view of the backed up data around a recovery point associated with an event, wherein the event is at least one of a system crash, a login failure, a configuration change, and an automatic backup operation of data;
shifting the data view around the recovery point through a direction-agnostic roll algorithm configured to utilize a roll-forward algorithm to shift the data view to a time after the recovery point and a roll-backward algorithm to shift the data view to a time before the recovery point, wherein the data view is specific to a volume object in a kernel that imitates another volume having original data and wherein the data view is managed by a kernel space that processes an access request through at least one table using a meta-data created in a retention log;
retaining differing quantities of data around the recovery point based on a programmatic methodology that considers space utilization and data consistency associated with the time after the recovery point and the time before the recovery point; and
coalescing data around the recovery point and other determinable recovery points at a threshold interval to reduce storage requirements.

7. The method of claim 6, further comprising determining that data integrity is consistent at the recovery point by examining data and meta-data associated with the recovery point.

8. The method of claim 7, further comprising associating the recovery point with at least one of an automatically generated event, a user definable event, and a prepackaged event.

9. The method of claim 8, further comprising generating a marking data at the recovery point to enable the direction-agnostic roll algorithm to operate and to reduce a recovery time objective when the direction-agnostic roll algorithm is applied.

10. The method of claim 9, further comprising maintaining data adjacent to the recovery point in a log data structure that is stored in a file system as a multitude of files.

11. A method comprising:
generating, at a predetermined interval, backed up data on a snapshot comprising a read-only copy of a data set frozen at a point in time;
forming a data view of the backed up data around a recovery point associated with an event, wherein the event is at least one of a system crash, a login failure, a configuration change, and an automatic backup operation of data;
shifting the data view around the recovery point through a direction-agnostic roll algorithm configured to utilize a roll-forward algorithm to shift the data view to a time after the recovery point and a roll-backward algorithm to shift the data view to a time before the recovery point, wherein the data view is managed by a kernel space that processes an access request through at least one table using a meta-data created in a retention log, and wherein the data view is specific to a volume object in a kernel that imitates another volume having original data;

determining that data integrity is consistent at the recovery point by examining data and meta-data associated with the recovery point;

maintaining data adjacent to the recovery point in a log data structure that is stored in a file system as a multitude of files; and coalescing data around the recovery point and other determinable recovery points at a threshold interval to reduce storage requirements.

12. The method of claim 11, further comprising associating the recovery point with at least one of an automatically generated event, a user definable event, and a prepackaged event.

13. The method of claim 12, further comprising generating a marking data at the recovery point to enable the direction-agnostic roll algorithm to operate and to reduce a recovery time objective when the direction-agnostic roll algorithm is applied.

14. The method of claim 13, further comprising retaining differing quantities of data around the recovery point based on a programmatic methodology that considers space utilization and data consistency associated with the time after the recovery point and the time before the recovery point.

* * * * *